United States Patent
Viste

(10) Patent No.: US 8,308,135 B2
(45) Date of Patent: Nov. 13, 2012

(54) DEVICE FOR ADJUSTING AND MAINTAINING THE HEIGHT OF A SEAT

(75) Inventor: Jean-François Viste, La Bonneville sur Iton (FR)

(73) Assignee: Parker Hannifin France SAS (FR)

( * ) Notice: Subject to any disclaimer, the term of this patent is extended or adjusted under 35 U.S.C. 154(b) by 340 days.

(21) Appl. No.: 12/716,400

(22) Filed: Mar. 3, 2010

(65) Prior Publication Data
US 2010/0224846 A1    Sep. 9, 2010

(30) Foreign Application Priority Data
Mar. 4, 2009 (FR) ...................................... 09 00973

(51) Int. Cl.
*B66F 3/24* (2006.01)
(52) U.S. Cl. ................................ 254/93 VA; 297/344.16
(58) Field of Classification Search ............. 254/93 VA; 248/588; 297/344.16
See application file for complete search history.

(56) References Cited

U.S. PATENT DOCUMENTS
| | | | |
|---|---|---|---|
| 4,946,145 A * | 8/1990 | Kurabe | 267/131 |
| 7,712,836 B2 * | 5/2010 | Deml | 297/344.16 |
| 7,909,058 B2 * | 3/2011 | Kang | 137/596.17 |
| 2009/0026816 A1 | 1/2009 | Haller | |
| 2009/0050220 A1 | 2/2009 | Kang | |

FOREIGN PATENT DOCUMENTS
EP    1844979    10/2007
WO    2008/067977    6/2008

* cited by examiner

*Primary Examiner* — Basil Katcheves
(74) *Attorney, Agent, or Firm* — Cantor Colburn LLP

(57) ABSTRACT

Device for adjusting a height of a seat, including at least one actuator connected to at least one source of power via at least one control valve having at least one control member for controlling the pressurizing of the actuator and at least one control member for controlling the exhausting of the actuator, the device including a cam associated, on the one hand, with at least one means of driving as a function of a variation in height of the seat, and, on the other hand, with the valve control members, the cam being configured to have at least one neutral position in which it actuates no control member, and at least two active positions about the neutral position, these respectively corresponding to a pressurizing of the actuator when the cam has pivoted about the neutral position in a direction corresponding to a reduction in the height of the seat and to an exhausting of the actuator when the cam is pivoted about the neutral position in a direction corresponding to a raising of the height of the seat, the means of driving also being mounted so that they can be disengaged in relation to the cam.

9 Claims, 3 Drawing Sheets

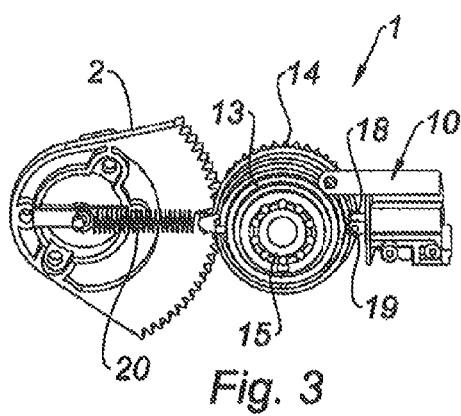
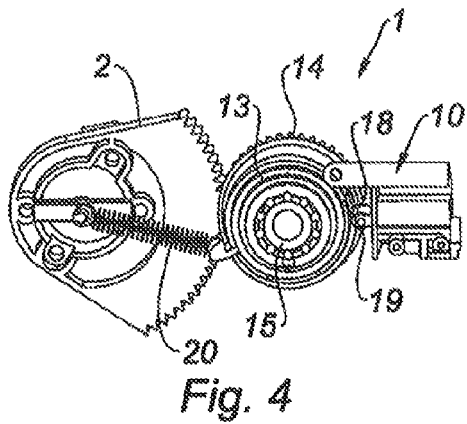
Fig. 3     Fig. 4
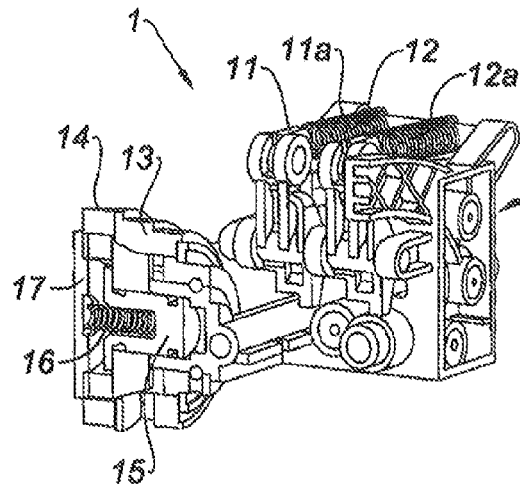
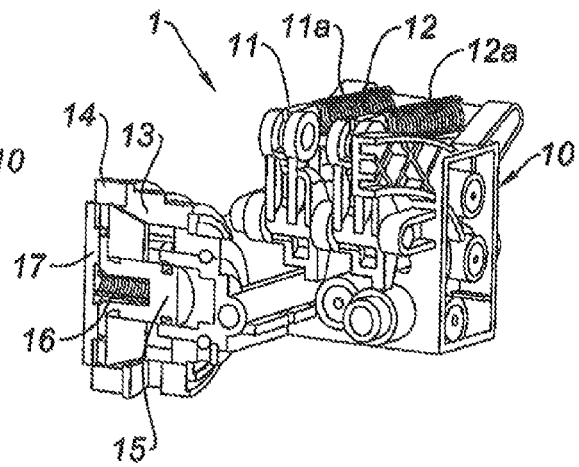
Fig. 5     Fig. 6
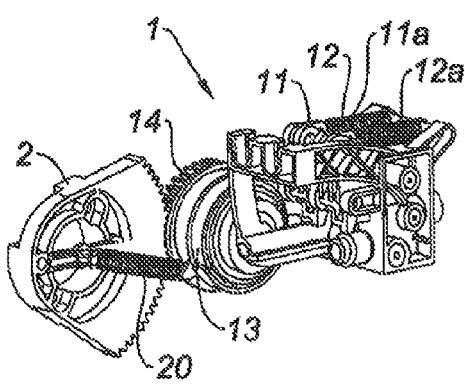
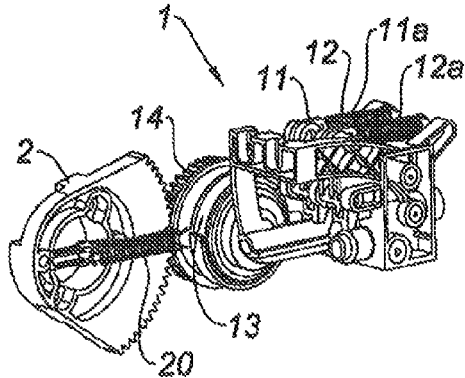
Fig. 7     Fig. 8

DEVICE FOR ADJUSTING AND MAINTAINING THE HEIGHT OF A SEAT

TECHNICAL FIELD

The invention relates to a device for adjusting the height of a seat for a motor vehicle and for keeping the said seat in position during a journey.

BACKGROUND

The driving seat of a motor vehicle is generally adjustable so that the driver can adapt the height of the seat to suit his own size with a view to optimal driving comfort.

To do this, a vehicle seat generally comprises a seat frame which can be adjusted relative to a base frame, generally anchored to the floor of the vehicle.

The height of the seat frame with respect to the base frame is adjusted using an actuator mounted between the said base frame and the said seat frame.

The actuator may, but need not necessarily, be a gas spring actuating cylinder.

This actuator is supplied by a source of pressure and is associated with a control valve for adjusting the extension or retraction of the actuator and therefore the height of the seat frame in relation to the base frame.

Furthermore, height adjustment systems may also be equipped with a function of memorizing and maintaining the height, particularly as a function of the weight of the driver.

A system such as this is known and described in document US 2009/0026816.

Such an adjusting system therefore comprises:
- a raising or "UP" function for raising the seat and which is manifested by the pressurizing of the actuating cylinder,
- a lowering or "DOWN" function for lowering the seat and which is manifested by the exhausting of the actuating cylinder,
- a regulating or "AUTOLEVEL" function which is able to compensate for variations in height of the seat about a predefined position stored in memory. This function is manifested by the adjusting of the pressure in the gas spring actuating cylinder.

In general, the UP and DOWN functions have the effect of resetting the memory of the AUTOLEVEL function, the reference height being altered.

Furthermore, a system like the one described in document US 2009/0026816 entails a large number of components, and in particular, at least two sets of valves.

There is thus a need for a more simple and effective system that displays additional functionalities.

BRIEF SUMMARY

To address this, the present invention relates to a device for adjusting the height of a seat, particularly a seat of a motor vehicle, comprising at least one actuator intended to be positioned between a fixed base and a base of the said seat, able to move relative to the fixed base, the said actuator being connected to at least one source of power via at least one control valve comprising at least one control member for controlling the pressurizing of the actuator and at least one control member for controlling the exhausting of the actuator, characterized in that the device comprises a cam associated, on the one hand, with at least one means of driving as a function of a variation in height of the seat, and, on the other hand, with the valve control members, the said cam being configured to have at least one neutral position in which it actuates no control member, and at least two active positions about the said neutral position, these respectively corresponding to a pressurizing of the actuator when the cam has pivoted about the neutral position in a direction corresponding to a reduction in the height of the seat and to an exhausting of the actuator when the cam is pivoted about the neutral position in a direction corresponding to a raising of the height of the seat, the means of driving also being mounted so that they can be disengaged in relation to the cam.

Thus, by equipping the device with a disengageable means of driving, it is possible to uncouple the cam on demand, making it possible to create a device that is simpler and includes improved functionalities. The device may also be reduced to a single set of valves.

The actuator will preferably be a pneumatic actuator and, more particularly, an actuating cylinder or a gas spring actuating cylinder connected to a source of pressure, but any actuator and suitable source of power is conceivable.

It will be specified that the valve may have a control part which is itself operated pneumatically, electrically or the like, particularly using microswitches and solenoid valves for example. The cam may for example act on one of the two microswitches depending on the direction in which it moves, which microswitches would then transmit an electrical signal to a solenoid valve which would act on the actuator.

Advantageously, the cam is equipped with a return means for returning it to the neutral position.

With preference, the means of driving is disengaged in relation to the cam using a pneumatic signal.

With further preference, the disengaging means is mounted opposing the action of an elastic return member tending to return to the engaged position.

Advantageously to complement this, the control valve also comprises at least one control member for controlling the pressurizing and at least one control member for controlling the exhausting of the actuator, each of these being able to be connected to a control lever for controlling the height of the seat so that this can be controlled manually, actuation of the said control members causing the means of driving to be disengaged in relation to the cam.

Advantageously, the means of driving the cam is a gearwheel. Of course, other means of driving are conceivable, particularly a set of pulleys, a system of belts, possibly toothed belts, for example.

Further advantageously, the clutch means is a clutch spider mounted inside the gearwheel such that it can effect a translational movement between a position in which it engages the gearwheel and transmits its movement to the cam and a position in which it no longer transmits the movement of the gearwheel to the cam.

With preference, the device comprises a means of exhausting the actuator that does not lead to the disengagement of the means of driving the cam.

This allows a functionality of deactivating the seat to be implemented. In this way, the driver has the option of deactivating his seat by exhausting the actuator, and this will allow the seat to drop back down into its lowest position. This may allow easier access to the cabin for example. The absence of disengagement during the actuation of this functionality allows the position of the seat prior to deactivation to be memorized. As a result, when the control is released, the seat reverts to its memorized position.

This function also limits the untimely consumption of pressurized air, particularly during prolonged stoppages of the vehicle, especially at night. It thus prevents the compressed air reservoirs from becoming emptied during this period of inactivity by isolating the actuating cylinder from the overall air supply circuit and thus isolating any leaks in the seat pneumatic circuit. When the vehicle is restarted, the driver immediately regains his setting simply by releasing this function.

The present invention also relates to a seat, particularly for a motor vehicle, characterized in that it comprises at least one device for adjusting and maintaining the height according to the invention.

The present invention also relates to a motor vehicle, characterized in that it comprises at least one seat according to the invention.

BRIEF DESCRIPTION OF THE DRAWINGS

The present invention will be better understood from reading the detailed description which follows, with reference to the attached drawing in which:

FIG. 3 is a view of the device of FIG. 1, with the cam in the neutral position.

FIG. 4 is a view of the device of FIG. 1, the cam being in the position for exhausting the actuating cylinder following a raising of the height of the seat.

FIGS. 5 and 6 are views in longitudinal section of the cam with which the device of FIG. 1 is equipped and of the associated means of driving, in the engaged and disengaged positions respectively.

FIGS. 7 and 8 are views of the device of FIG. 1 with the actuating cylinder completely vented and refilled.

DETAILED DESCRIPTION

Figure 1:
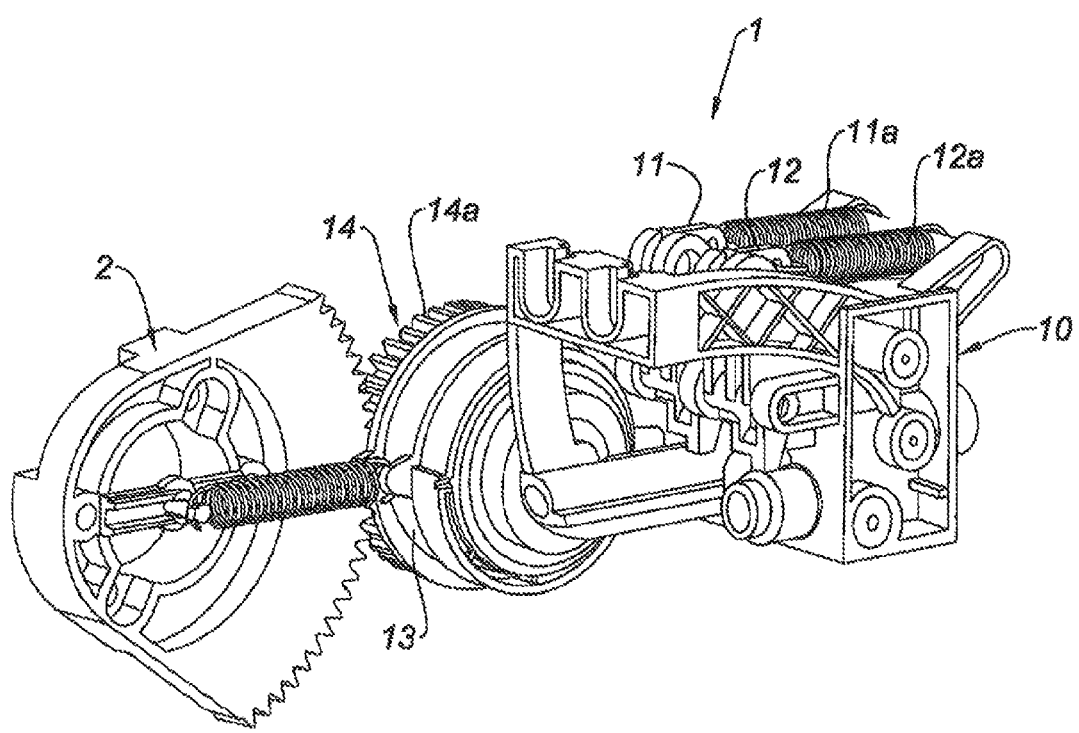
FIG. 1 is a view in profile of a device according to the invention.
Figure 2:
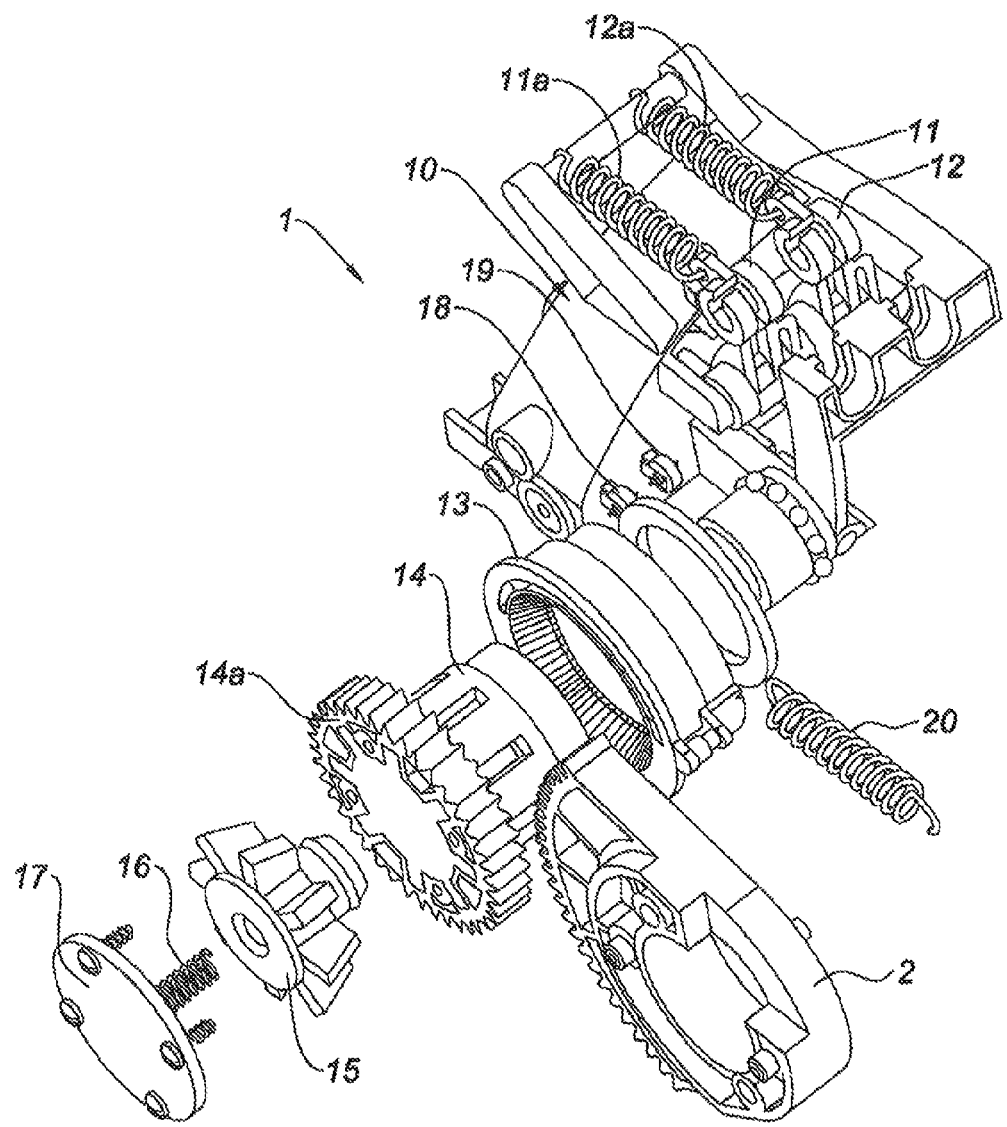
FIG. 2 is an exploded profile view of the device of FIG. 1.

A device 1 according to the invention, as depicted in FIGS. 1 to 8, is intended to collaborate with a fixed gearwheel 2 mounted on the seat and which accompanies it in its vertical movements.

The device 1 according to the invention comprises an actuator (not depicted) intended to be positioned between a fixed base and a base of the said seat, able to move relative to the fixed base, and connected to a pressure source via at least one control valve 10.

The control valve 10 comprises a first control lever 11 for controlling the raising and lowering functions. The control lever 11 is common to both these functions and is designed, for example, to control the raising of the seat by pressurizing the actuator when the user pulls on the lever 11 and to control the lowering of the seat by exhausting the actuator when the user pushes on the lever 11. An elastic return member 11a forces it to return to a neutral position.

The control valve 10 also comprises a control lever 12 for controlling a function of deactivating the seat allowing the actuator to be completely exhausted. The lever 12 is also mounted against the action of an elastic return means 12a.

The design of the control valve 10 and of the means for controlling the venting and pressurizing falls within the routine practice of those skilled in the art of pneumatic distributors, pneumatic control valves, etc.

It will be noted that control over these functions may be had in various ways, particularly using electrical operation (microswitches), pneumatic operation (pneumatically operated slides), etc. The mode of operation is of no importance to the subject matter of the invention.

The control valve is associated with a system for maintaining the height.

This system comprises a cam 13 associated with a means of driving 14 in the form of a pinion able to engage inside the cam 13 and comprising a gearwheel 14a itself engaged with the fixed gearwheel 2 fixed to the seat.

According to the invention, the pinion 14 may be engaged with the cam 13 in a disengageable manner. To do this, the pinion 14 is equipped with a clutch spider 15 mounted inside it and able to move axially between a position in which the clutch spider 15 engages the pinion 14 with the cam 13 and a disengaged position in which the clutch spider 15 is pushed back and disengaged from the cam 13.

The clutch spider 15 is mounted against the action of an elastic return means 16 that forces it towards the engaged position. The elastic return means 16 is mounted on a pressure disc 17 fixed in an upper surface of the pinion 14.

Thus, the movement involved in varying the height of the seat is transmitted via the fixed gearwheel 2 to the pinion 14 which is given a corresponding rotational movement, the said pinion itself transmitting this rotational movement to the cam 13.

The cam 13 is designed and arranged in such a way that it can collaborate with two additional control means 18, 19 of the control valve 10.

The first additional control means 18 is aimed at controlling the pressurizing of the actuator while the second control means 19 is aimed at controlling the exhausting of the actuator.

Like before, these control means 18, 19 may, inter alia, be microswitches or control means operated by a pneumatic signal.

It will also be noted that the cam is equipped with an elastic return means 20 for returning it towards a neutral position, this elastic return means 20 in this particular instance being a spring that has a first end attached to the cam 13 and a second end attached to the fixed gearwheel 2.

Actuation of the control means 18, 19 by the cam 13 is achieved with greater thicknesses on the periphery of the cam 13 facing each of the control means 18, 19 and about the neutral position.

Thus, when the cam 13 is in the neutral position, there is no additional thickness actuating one of the control means 18, 19.

When the cam 13 is made to rotate in a direction corresponding to a lowering of the height of the seat, the said cam 13 moves away from its neutral position and a first additional thickness actuates the corresponding control means 18 allowing the seat to be repressurized.

Conversely, when the cam 13 is rotated in a direction corresponding to an increase in the height of the seat, the said cam 13 moves away from its neutral position and a second additional thickness actuates the corresponding control means 19 allowing the seat to be repressurized.

The control means 18 and 19 are actuated by their respective additional thickness until such point as the cam 13 returns to its neutral position, under the effect of the corresponding raising or lowering movement of the seat and transmitted via the fixed gearwheel 2 and the pinion 14.

FIGS. 3 and 4 illustrate how the device 1 works.

When the control lever 11 for the functions of raising and lowering is in the rest position, the cam 13 moves as one with the pinion 14 (the clutch spider 15 is engaged). Variations in height of the seat are converted into an angular oscillation of the cam 13. The latter then acts on the control means 18, 19 to re-establish and adjust the pressure in the actuator.

Engagement and disengagement of the clutch spider 15 is depicted in FIGS. 5 and 6.

When the control lever 11 for raising and lowering is actuated, a pneumatic signal is sent to the clutch spider 15 which is pushed back into the disengaged position, thus uncoupling the cam 13 from the pinion 14.

If the cam 13 is not in the neutral position when the control lever 11 is actuated, this cam is returned to that position and held there by the return spring 20. When the lever 11 is released and upon engagement of the clutch spider 15 recoupling the cam to the pinion 14, a new reference position is defined and mechanically memorized.

FIGS. 7 and 8 illustrate the deactivation function.

When the deactivation lever 12 is actuated, the actuator is exhausted and completely emptied. The cam 13 however remains secured to the pinion 14 and thus continues to memorize the previous reference position. Upon release of the deactivation lever 12, the cam 13 actuates the control means 18 controlling automatic reinflation of the actuator until the seat has returned to the stored height, that is to say until the cam 13 has returned to the neutral position.

Although the invention has been described using one particular embodiment, it is quite obvious that it is not in any way restricted thereto and that it comprises all technical equivalents of the means described and combinations thereof where these fall within the scope of the invention.

The invention claimed is:

1. Device for adjusting the height of a seat, particularly a seat of a motor vehicle, comprising:
    at least one actuator intended to be positioned between a fixed base and a base of the said seat, able to move relative to the fixed base, the said actuator being connected to at least one source of power via at least one control valve comprising at least one control member for controlling the pressurizing of the actuator and at least one control member for controlling the exhausting of the actuator,
    a cam associated with at least one means of driving as a function of a variation in height of the seat and with the valve control members,
    the cam being configured to have at least one neutral position in which the cam actuates no control member, and at least two active positions about the said neutral position, the active positions respectively corresponding to a pressurizing of the actuator when the cam has pivoted about the neutral position in a direction corresponding to a reduction in the height of the seat and to an exhausting of the actuator when the cam is pivoted about the neutral position in a direction corresponding to a raising of the height of the seat, the means of driving also being mounted so that the means can be disengaged in relation to the cam,
    wherein the control valve further includes at least one control member for controlling the pressurizing and at least one control member for controlling the exhausting of the actuator, each of the control members being configured to connect to a control lever for controlling the height of the seat so that the height can be controlled manually, actuation of the control members causing the means of driving to be disengaged in relation to the cam.

2. Device according to claim 1, wherein the cam is equipped with a return means for returning the cam to the neutral position.

3. Device according to claim 1, wherein the means of driving is disengaged in relation to the cam using a pneumatic signal.

4. Device according to claim 1, wherein the disengaging means is mounted opposing an action of an elastic return member tending to return to the engaged position.

5. Device according to claim 1, wherein the means of driving the cam is a gearwheel.

6. Device according to claim 5, wherein a clutch means is provided as a clutch spider mounted inside the gearwheel such that it can effect a translational movement between a position in which the clutch means engages the gearwheel and transmits its movement to the cam and a position in which it no longer transmits the movement of the gearwheel to the cam.

7. Device according to claim 1, further comprising a means of exhausting the actuator that does not lead to a disengagement of the means of driving the cam.

8. Seat, particularly for a motor vehicle, comprising at least one device for adjusting and maintaining the height according to claim 1.

9. Motor vehicle, comprising at least one seat according to claim 8.

* * * * *